(12) United States Patent
Bardell et al.

(10) Patent No.: US 11,549,451 B1
(45) Date of Patent: Jan. 10, 2023

(54) INTAKE BYPASS FOR LIQUID FUEL ENGINE

(71) Applicant: Caterpillar Inc., Peoria, IL (US)

(72) Inventors: Michael Bardell, Tucson, AZ (US); David T. Montgomery, Edelstein, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/660,794

(22) Filed: Apr. 26, 2022

(51) Int. Cl.
| | |
|---|---|
| F02B 29/04 | (2006.01) |
| F02D 19/08 | (2006.01) |
| F02D 41/00 | (2006.01) |
| F02B 37/16 | (2006.01) |
| F02M 61/14 | (2006.01) |
| F02D 19/06 | (2006.01) |
| F02D 19/12 | (2006.01) |

(52) U.S. Cl.
CPC ...... *F02D 41/0007* (2013.01); *F02B 29/0418* (2013.01); *F02B 29/0425* (2013.01); *F02B 29/0493* (2013.01); *F02B 37/16* (2013.01); *F02D 19/0639* (2013.01); *F02D 19/0649* (2013.01); *F02D 19/0655* (2013.01); *F02D 19/0689* (2013.01); *F02D 19/0697* (2013.01); *F02D 19/08* (2013.01); *F02D 19/12* (2013.01); *F02D 41/0025* (2013.01); *F02M 61/145* (2013.01); *F02D 2200/0406* (2013.01); *F02D 2200/0414* (2013.01); *F02D 2200/101* (2013.01)

(58) Field of Classification Search
CPC .............. F02B 29/0406; F02B 29/0418; F02B 29/0493; F02D 19/0649; F02D 19/0655; F02D 19/08; F02D 19/12; F02D 41/0007; F02D 41/0025; F02M 61/145
USPC .................. 60/599, 600; 123/1 A, 431, 563, 123/575–578
See application file for complete search history.

(56) References Cited

U.S. PATENT DOCUMENTS

| | | | |
|---|---|---|---|
| 4,546,732 A | 10/1985 | Mae et al. | |
| 5,269,144 A * | 12/1993 | Miller | F02B 37/12 60/609 |
| 6,276,334 B1 | 8/2001 | Flynn et al. | |
| 7,222,614 B2 * | 5/2007 | Bryant | F01L 3/205 123/563 |
| 7,661,414 B2 | 2/2010 | Kamio | |
| 11,041,452 B2 | 6/2021 | Dudar | |

(Continued)

FOREIGN PATENT DOCUMENTS

| | | |
|---|---|---|
| CN | 110848013 B | 2/2020 |
| CN | 113217239 A | 8/2021 |
| CN | 214366438 U | 10/2021 |

*Primary Examiner* — Erick R Solis
(74) *Attorney, Agent, or Firm* — Bookoff McAndrews, PLLC (57) ABSTRACT

A fuel supply system for an internal combustion engine includes an air compressor, an air cooler connected downstream of the air compressor and the compressed air supply passage, and a bypass passage connected downstream of the air compressor. The fuel supply system also includes a fuel injector secured to the compressed air supply passage or secured to the bypass passage and a valve connected between the air compressor and the air cooler, the valve being configured to block a flow of intake air to the air cooler, causing the intake air to flow to the bypass passage or to permit the flow of intake air to the air cooler.

20 Claims, 3 Drawing Sheets

(56) References Cited

U.S. PATENT DOCUMENTS

| | | | |
|---|---|---|---|
| 2002/0007816 A1* | 1/2002 | Zur Loye | F02B 1/04 123/305 |
| 2004/0123849 A1* | 7/2004 | Bryant | F02B 33/26 123/563 |
| 2004/0139943 A1* | 7/2004 | Kern | F02B 43/00 123/198 D |
| 2014/0305415 A1* | 10/2014 | Somhorst | F02D 41/3035 123/568.21 |
| 2015/0128587 A1* | 5/2015 | Dane | F02M 26/25 123/542 |

* cited by examiner

FIG. 1

FIG. 2

INTAKE BYPASS FOR LIQUID FUEL ENGINE

TECHNICAL FIELD

The present disclosure relates generally to methods and systems for internal combustion engine intake systems and, more particularly, to systems and methods for controlling flow of air, or an air and fuel mixture, to an internal combustion engine.

BACKGROUND

Internal combustion engine designs are increasingly diversifying, enabling combustion of various types of fuels, either instead of or in addition to traditional fuels, such as diesel fuel or gasoline. Some of these engine systems combust liquid fuels. These non-traditional liquid fuel combustion systems (e.g., systems that store fuel in liquid form and/or supply fuel in liquid form to one or more fuel injectors), can produce a relatively low amount of soot when the fuel is combusted, can use fuel derived from biogenic sources, or can use fuel created with the use of carbon dioxide captured from the atmosphere. Internal combustion engines designed for use with so-called "alternative" fuels may be capable of combusting liquid-stored fuels having a high amount (e.g., greater than 50%) of an alcohol, such as methanol or ethanol. The alternative fuel can be combusted on its own, or by using another fuel, such as diesel fuel, to generate a pilot flame. Generally, greater environmental benefits can be achieved by replacing increasing volumes of traditional fuel, such as diesel fuel, with an alternative fuel.

While alternative fuels, such as methanol and ethanol, introduce benefits such as reduced negative effects on the environment, there are challenges associated with the use of these fuels. Methanol, for example, has a lower energy density and can evaporate more slowly as compared to diesel fuel, which is problematic as full evaporation is desired to achieve desired combustion. Due to the relatively lower energy density of methanol, a larger amount of this fuel should be injected to generate the same amount of energy as diesel fuel. This, in turn, further slows evaporation of the injected methanol. These issues can be compounded when air supplied to the internal combustion engine is relatively cold.

A methanol engine is described in CN 214366438 U to Zhang ("the '438 patent"). The methanol engine in the '438 patent includes an air intake bypass pipe and a three-way valve that controls whether air is provided to a cooler. The position of the three-way valve is set in response to the temperature of intake air. While the methanol engine described in the '438 patent may be useful for systems in which methanol is introduced directly into a plenum of an intake manifold, it may be unable to ensure that this methanol fully evaporates, or may require other tradeoffs that negatively impact engine operation to facilitate evaporation of the injected fuel.

The systems and methods of the present disclosure may solve one or more of the problems set forth above and/or other problems in the art. The scope of the current disclosure, however, is defined by the attached claims, and not by the ability to solve any specific problem.

SUMMARY

In one aspect, a fuel supply system for an internal combustion engine may include an air compressor, an air cooler connected downstream of the air compressor and the compressed air supply passage, and a bypass passage connected downstream of the air compressor. The fuel supply system may also include a fuel injector secured to the compressed air supply passage or secured to the bypass passage and a valve connected between the air compressor and the air cooler, the valve being configured to block a flow of intake air to the air cooler, causing the intake air to flow to the bypass passage or to permit the flow of intake air to the air cooler.

In another aspect, a fuel supply system may include an internal combustion engine, an air compressor configured to compress air received by the internal combustion engine, an air cooler for reducing a temperature of the compressed air, and a compressed air bypass passage connected downstream of the air compressor. The fuel supply system may also include a fuel injector secured to the compressed air supply passage or secured to the compressed air bypass passage, a bypass valve having a bypass position configured to cause at least a portion of the compressed air to bypass the air cooler, and an electronic control module configured to generate a command to cause the bypass valve to enter the bypass position.

In yet another aspect, a fuel supply method for supplying fuel to an internal combustion engine may include, compressing air with an air compressor, injecting fuel into the compressed air at a location upstream of an intake plenum to form a fuel and air mixture, the intake plenum being a portion of an intake manifold having a plurality of runners extending from the intake plenum toward the internal combustion engine, and causing at least some compressed air to bypass an air cooler. The method may also include supplying the air and fuel mixture to the internal combustion engine and combusting the air and fuel mixture within the internal combustion engine.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a method or apparatus that comprises a list of elements does not include only those elements, but may include other elements not expressly listed or inherent to such a method or apparatus. In this disclosure, relative terms, such as, for example, "about," "substantially," "generally," and "approximately" are used to indicate a possible variation of ±10% in the stated value or characteristic. As used herein, "intake air" is defined to include both air that is free of fuel, and air containing at least some fuel, whether this fuel is in liquid form, vaporized form, or a mix of liquid droplets and vaporized fuel, unless it is specifically stated that the air contains no fuel.

Figure 1:
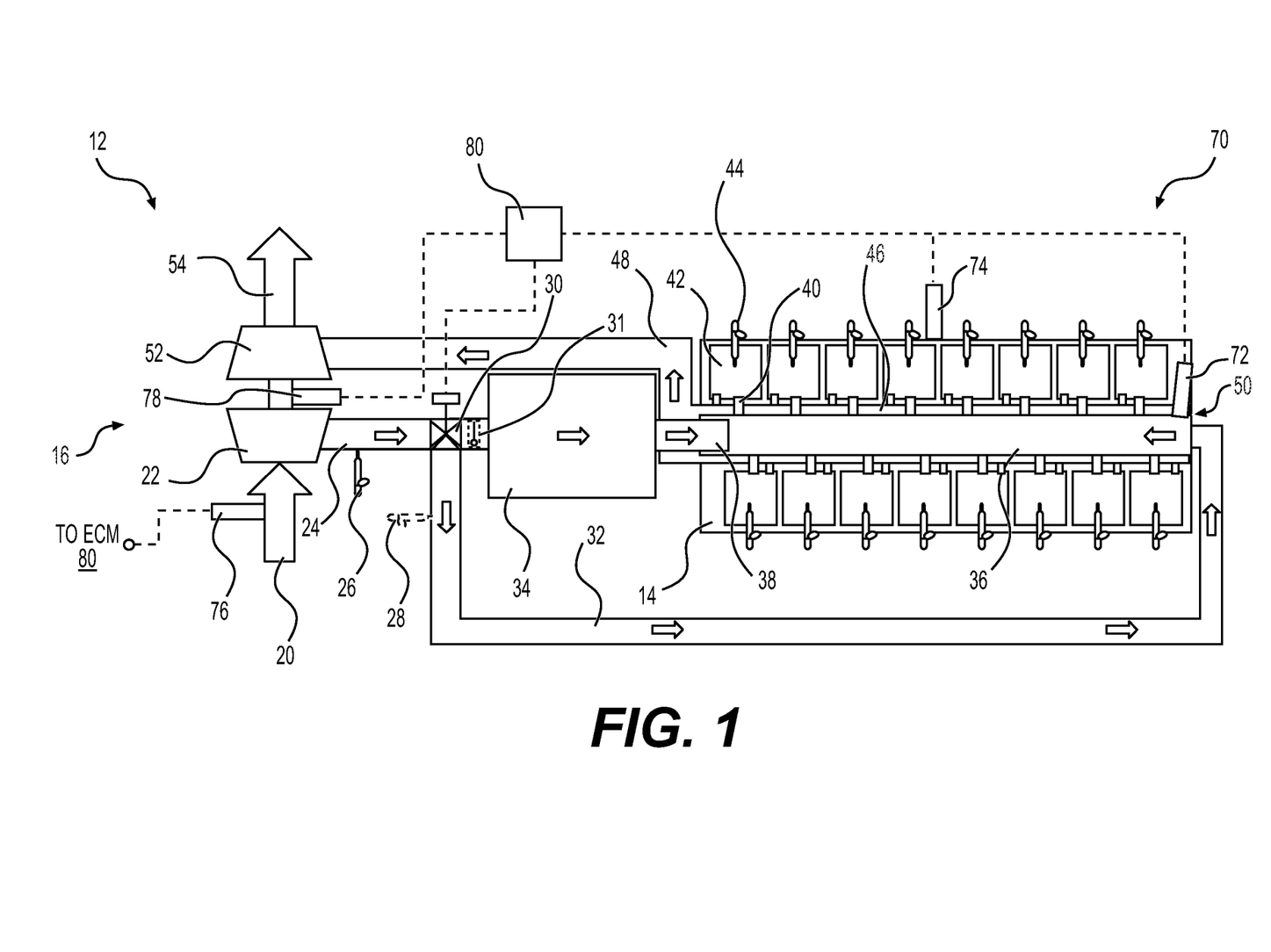
FIG. 1 is a schematic view of an intake and combustion system, according to aspects of the disclosure.

FIG. 1 illustrates an exemplary intake and combustion system 12, according to aspects of the invention. Intake and combustion system 12 may be part of a marine vessel, machine, vehicle, or power generation system, and may include an internal combustion engine 14 and an air and fuel supply system 16. Air and fuel supply system 16 may be connected to engine 14 and may facilitate compression of intake air, introduction of fuel to the compressed air, and supply of the compressed air and fuel to engine 14 during at least some operating conditions of engine 14.

Intake and combustion system 12 may include one or more electronically-controlled components, such as a flow control valve 30, one or more feedback devices, and one or more electronic control devices. Feedback devices of intake and combustion system 12 may be included in a sensor system 70 that includes sensors configured to generate signals that facilitate control of flow control valve 30. An electronic control module (ECM) 80 of system 12 may monitor conditions of system 12 via sensor system 70. ECM 80 may be configured, via programming, to generate commands to facilitate desired operation of the electronically-controlled components, such as valve 30, based on feedback signals received from sensor system 70. ECM 80 may be a control module for controlling multiple functions of system 12 and engine 14, as shown in FIG. 1. Alternatively, ECM 80 may be an electronic control module or control unit that is dedicated for controlling aspects of air and fuel supply system 16, and specifically, flow control valve 30.

Engine 14 may include a plurality of cylinders 42 in which fuel injected by fuel injector 26 may be combusted. In addition to an injector upstream of an intake manifold and/or near the outlet of an air compressor, such as fuel injector 26, engine 14 may include one or more direct fuel injectors 44 configured to inject a second fuel, such as diesel fuel, directly into respective cylinders 42 of engine 14. The second fuel may be useful to generate a flame that ignites fuel injected by fuel injector 26. However, in at least some configurations, a spark-generating device may be present to initiate combustion of fuel within cylinders 42, enabling engine 14 to operate entirely on an alternative fuel injected by fuel injector 26. While internal combustion engine 14 is illustrated in FIG. 1 as a 16-cylinder engine having two cylinder banks, as understood, engine 14 may have more or fewer cylinders 42 and may have one cylinder bank.

Suitable fuels for injector 26 may include fuels stored in liquid form, such as an alcohol. Exemplary alternative fuels may include: methanol, ethanol, butanol, propanol, and/or other alcohols, including blends thereof, ammonia, or dimethyl ether. An alcohol-containing liquid fuel may have at least about 50% alcohol by volume, such as fuel containing about 85% methanol by volume or about 85% ethanol by volume. Engine 14 may also be configured to operate entirely on fuel injected with one or more direct fuel injectors 44. Thus, depending on operating conditions, engine 14 may operate entirely on an alternative fuel, such as methanol, on a mixture of the alternative fuel and a second fuel (e.g., diesel fuel), or entirely on the second fuel.

Air and fuel supply system 16 may include a series of passages for supplying air to engine 14, including an air intake 20, an air compressor 22 of a turbocharger, and a compressed air passage 24 downstream of an outlet of compressor 22. Air and fuel supply system 16 may also include a compressed air cooler 34 (also referred to as an "aftercooler") connected to an air cooler outlet 38, a bypass passage 32 for compressed air, and fuel, if desired, to bypass air cooler 34, and an intake manifold 50 including an intake plenum 36 and plurality of runners 40. Air and fuel supply system 16 may also include components for supplying fuel (e.g., fuel stored as a liquid) to engine 14, as described below. Air intake 20 may include one or more passages, air filters, etc., configured to draw in ambient air from outside of system 12. Compressor 22, connected downstream of air intake 20, may be a radial compressor connected to a turbine 52 via a shaft, to compress air for combustion in engine 14. An outlet of compressor 22 may connect to compressed air passage 24. While compressor 22 may be driven by flow of exhaust through turbine 52, if desired, compressor 22 may otherwise mechanically-driven or electrically-driven.

Downstream of compressor 22, air and fuel supply system 16 may include a bifurcated path for intake air, for example extending from compressed air passage 24. In the configuration shown in FIG. 1, a relatively short first path may extend from the outlet of compressor 22, this first path including compressed air passage 24, flow control valve 30, air cooler 34, and air cooler outlet 38. A second path, which may be longer than the first path, may also extend from the outlet of compressor 22. This second path may include at least a portion of compressed air passage 24, and bypass passage 32. As shown in FIG. 1, bypass passage 32 may extend from compressed air passage 24 so as to form a junction with compressed air passage 24. In a first configuration, flow control valve 30 may be included as part of both the first path and the second path. However, valve 30 may instead be located at an alternate location 31. A valve at alternate location 31 may cause a flow of intake air to bypass passage 32 when in a closed or partially closed position in which valve 30 blocks at least some intake air from flowing through a portion of the first path.

Intake plenum 36 may be connected to both bypass passage 32 and to air cooler outlet 38. Intake plenum 36 may be part of an intake manifold 50 that also includes a plurality of runners 40 respectively connected to cylinders 42 of internal combustion engine 14. Each runner 40 of intake manifold 50 may connect a respective engine cylinder 42 of internal combustion engine 14 to intake plenum 36 so as to supply air and fuel to this cylinder 42. If desired, intake manifold 50, and in particular, intake plenum 36, may be free of a fuel injector, as port-injected fuel is supplied via fuel injector 26 or an injector at location 28, as described below.

Downstream of cylinders 42, an exhaust manifold 46 may be configured to receive exhaust generated by the combustion of air and fuel. This exhaust may be guided by an outlet passage 48 to turbine 52 of the turbocharger formed by compressor 22 and turbine 52. Turbine 52 may be driven by exhaust exiting system 12 via an exhaust outlet 54. If desired, exhaust outlet 54 may include one or more after-treatment devices, such as a catalyst or particulate filter, to reduce the emission of undesirable constituents, such as NOx or soot, that may tend to be generated when engine 14 operates partially or entirely on diesel fuel.

As indicated above, air and fuel supply system 16 may include one or more fuel injectors 26. Injectors 26 may be connected upstream of intake manifold 50, and in particular, upstream of intake plenum 36 of intake manifold 50. Fuel injectors 26, may be configured to inject fuel stored from one or more liquid fuel storage devices into a passage for guiding compressed air towards engine 14. In the exemplary configuration illustrated in FIG. 1, fuel injectors 26 are secured to compressed air passage 24, and/or secured to bypass passage 32 at alternate location 28.

Flow control valve 30 may be configured to regulate a flow of air, and in some configurations, to regulate an air and fuel mixture, that is supplied to air cooler 34. Flow control valve 30 may be connected upstream of air cooler 34, and in particular, between air cooler 34 and compressor 22. In at least some embodiments, flow control valve 30 is a three-way valve, as shown in FIG. 1. Flow control valve 30 may include a first inlet downstream of compressor 22, a first outlet in communication with air cooler 34, and a second outlet in communication with bypass passage 32, such that a flow of intake air (air or an air and fuel mixture) that passes through the first outlet does not enter bypass passage 32, and a flow of intake air that passes through the second outlet bypasses air cooler 34. In some aspects, flow control valve 30 may have a first position in which an entire flow through valve 30 is directed to air cooler 34, and a second position in which an entire flow through valve 30 is directed to bypass passage 32. Flow control valve 30 may be a proportional valve including a plurality of third positions in which at least some flow passes through valve 30 to air cooler 34 and at least some flow passes through valve 30 to bypass passage 32. When flow control valve 30 is a proportional valve, the flow permitted to air cooler 34 as compared to the flow permitted towards bypass passage 32 may be determined by electronic control module 80, as described below. ECM 80 may further be configured to control valve 30 in configurations where valve 30 is not a proportional valve.

In at least some configurations, flow control valve 30 may be positioned in compressed air passage 24 at a location downstream of a junction of compressed air passage 24 and bypass passage 32. For example, flow control valve 30 may be positioned at location 31, represented by a dashed-line outline in FIG. 1. Location 31 may be located downstream of a junction of compressed air passage 24 and bypass passage 32. In this configuration, a bypass valve at location 31 may be a butterfly valve, a solenoid valve, or any other suitable type of valve configured to regulate a flow from compressor 22 to air cooler 34.

In some aspects, flow control valve 30 at location 31 may be a proportional two-way valve that includes a fully-open position in which a full flow from compressed air passage 24 to air cooler 34 is permitted, a fully-closed position in which no flow to air cooler 34 is permitted, and a plurality of intermediate positions in which flow from compressed air passage 24 to air cooler 34 is regulated such that at least some flow is diverted from compressed air passage 24 to bypass passage 32. Similar to the three-way proportional valve described above, the desired position (e.g., a desired partially-open position) may be determined with ECM 80. In some configurations, when at least some intake air is provided to bypass passage 32, ECM 80 may control one or more heaters (not shown) along the length of passage 32 to generate heat to warm fuel present within this air, facilitating vaporization of this fuel. When heaters are present along passage 32, these heaters may be electrically-powered heaters. If desired, a heat exchanger, using jacket water or engine oil, may be placed adjacent to passage 32 to facilitate wall temperatures of between about 90 degrees Celsius and about 95 degrees Celsius at one or more portions of passage 32.

Whether flow control valve 30 is a three-way valve or a two-way valve, valve 30 may be electronically-controlled. In particular, flow control valve 30 may be controlled by electronic control module 80 based on one or more signals generated by sensor system 70. The position of flow control valve 30 may facilitate evaporation of liquid fuel injected by fuel injector 26. For example, in some configurations, positioning valve 30 between a source of fuel such as fuel injector 26 and air cooler 34 may allow valve 30 to cause at least a portion of the fuel injected with fuel injector 26 to bypass air cooler 34 and to follow a lengthened path and thus travel a greater distance to engine 14, causing increased residence time, at an increased temperature, for injected fuel before the fuel reaches engine 14.

In some aspects, the position of a fuel injector for liquid fuel (e.g., fuel that is supplied to a fuel injector while in a liquid state), such as methanol, may be set in a manner that increases the residence time of injected fuel before the fuel reaches engine 14. For example, fuel injector 26 may be positioned at a location, as shown in FIG. 1 upstream of air cooler 34, and in particular, between flow control valve 30 (or a valve at location 31) and air intake 20. When fuel injector 26 is secured to compressed air passage 24 as shown in FIG. 1, fuel injector 26 enables flow control valve 30 to control the proportion of fuel that bypasses air cooler 34.

Alternative fuel injector location 28, represented in dashed lines in FIG. 1, may be employed to allow an entire quantity of injected fuel to bypass air cooler 34. Alternative location 28, or other alternative locations, may secure a fuel injector upstream of fuel manifold 50 and downstream of compressor 22. In particular, a fuel injector at location 28 may be secured directly to bypass passage 32 such that an entirety of the injected fuel bypasses air cooler 34, regardless of the position of flow control valve 30 (or a flow control valve at location 31). In some aspects, the presence of a fuel injector at location 28 may allow an entirety of the injected fuel to bypass cooler 34, while a portion of the air can flow through cooler 34. If desired, injectors may be located at both locations indicated in FIG. 1, or one or more other locations.

Sensor system 70 may include sensors for monitoring aspects of air and fuel supply system 16 and/or of engine 14. In the exemplary configuration illustrated in FIG. 1, sensor system 70 includes an intake manifold sensor 72, an engine sensor 74, an intake air sensor 76, and a turbocharger sensor 78. Intake manifold sensor 72 may include a temperature sensor configured to generate a signal that indicates a temperature of intake air supplied to or within intake manifold 50, a pressure sensor configured to generate a signal that indicates a pressure of intake air supplied to or within intake manifold 50, or both. As understood, the signal generated by intake manifold sensor 72 may correspond to an air and fuel mixture. Engine sensor 74 may be configured to monitor one or more conditions of engine 14 useful for calculating fuel rate or engine load, such as engine speed. If desired, engine sensor 74 may monitor engine temperature (e.g., by detecting engine oil temperature), or other conditions of engine 14. Intake air sensor 76 may detect conditions of air before this air enters compressor 22, such as an airflow rate. Intake air sensor 76 may also include temperature and/or pressure sensors. Turbocharger sensor 78 may monitor a speed of a turbocharger, and may output a signal indicative of a speed of compressor 22.

ECM 80 may be enabled, via programming, to receive signals from sensors of system 70 and to generate commands for control valve 30. In particular, ECM 80 may be configured to control a position of flow control valve 30 based on one or more signal received from sensor system 70 to facilitate full evaporation of fuel injected upstream of intake manifold 50. ECM 80 may also generate commands that control injections performed by fuel injector 26 and direct fuel injectors 44.

ECM 80 may embody a single microprocessor or multiple microprocessors that receive inputs and generate outputs. ECM 80 may include a memory, a secondary storage device, a processor such as a central processing unit, or any other means for accomplishing a task consistent with the present disclosure. The memory or secondary storage device associated with ECM 80 may store data and software to allow ECM 80 to perform its functions, including the functions described with respect to method 300, described below. Numerous commercially available microprocessors can be configured to perform the functions of ECM 80. Various other known circuits may be associated with ECM 80, including signal-conditioning circuitry, communication circuitry, and other appropriate circuitry.

Figure 2:
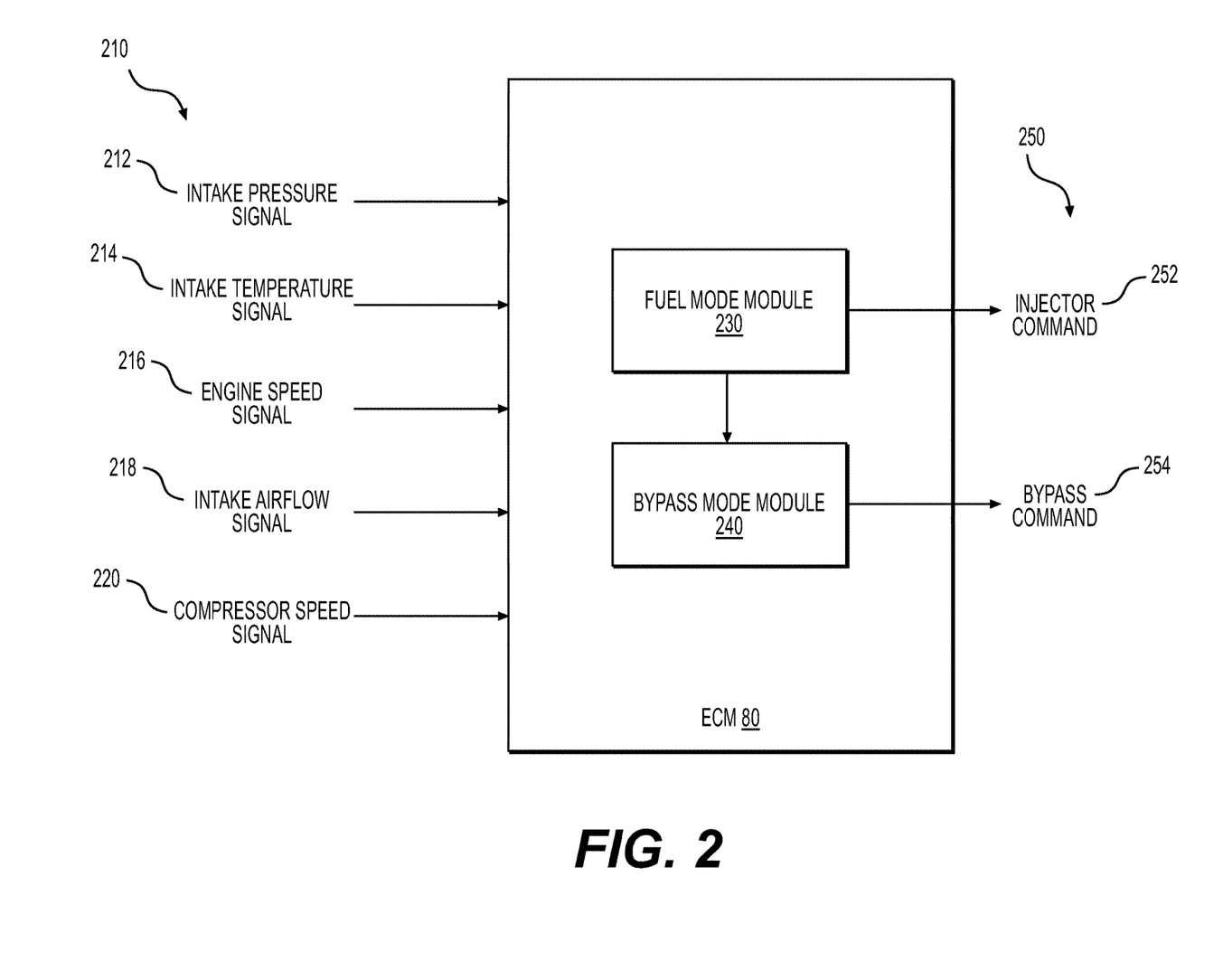
FIG. 2 is a block diagram representing an electronic control module for the intake and combustion system of FIG. 1.

FIG. 2 is a block diagram illustrating an exemplary configuration of ECM 80. As shown in FIG. 2, ECM 80 may receive inputs 210, including inputs generated by sensor system 70, as described above. ECM 80 may include one or more modules (e.g., programming) that enable ECM 80 to generate outputs 250 that are based, at least in part, on one or more inputs 210. ECM 80 may include a fuel mode module 230 that allows ECM 80 to determine whether fuel should be injected by fuel injector 26, by one or more direct fuel injectors 44, or both. A bypass mode module 240 may receive a fuel mode information (e.g., injector commands 252) from fuel mode module 230, and may generate a bypass command 254 for controlling flow control valve 30 based on one or more inputs 210 and based on the received fuel mode information.

Inputs 210 may include signals generated with one or more sensors of sensor system 70. For example, an intake pressure signal 212 may be generated with intake manifold sensor 72 to indicate a pressure of air received by intake manifold 50. An intake temperature signal 214 may be generated with intake manifold sensor 72 or an additional intake manifold sensor. Engine speed signal 216 may be generated with engine sensor 74. An intake airflow signal 218 may indicate a quantity of air received with compressor 22 as measured with intake air sensor 76. Compressor speed signal 220 may correspond to a speed of compressor 22 detected with turbocharger sensor 78.

Fuel mode module 230 may enable ECM 80 to determine whether engine 14 is operated with fuel from fuel injector 26. For example, fuel mode module 230 may determine that engine 14 will be operated solely with fuel from fuel injector 26. This may be performed in response to a manual request from an operator of engine 14 when it is desirable to ensure reduced emissions of engine 14. In one particular example, an operator of engine 14 may request a low emissions operation of engine 14 when engine 14 is a marine engine currently at a location where low emissions are desirable or required (e.g., at a port). Fuel mode module 230 may be further configured to operate engine 14 with fuel from fuel injector 26 when engine 14 is in an idle, low-load, or moderate-load condition. When engine 14 is in a high-load condition, fuel mode module 230 may cause engine 14 to operate on fuel from both fuel injector 26 and direct fuel injectors 44, or solely on fuel injected by direct fuel injectors 44. In some aspects, injector commands 252 may be generated by fuel mode module 230 in accordance with an availability of fuel. For example when diesel fuel is low, module 230 may issue commands that tend to inject a higher amount of fuel with fuel injector 26. Accordingly, injector command 252 generated with fuel mode module 230 may include commands issued to fuel injector 26 and/or one or more direct fuel injectors 44 to inject fuel in a desired manner.

Bypass mode module 240 may receive a desired fuel mode from fuel mode module 230. As described above, this desired fuel mode may include fuel injection solely from fuel injector 26 (a first mode), solely from one or more direct fuel injectors 44 (a second mode), or a dual fuel injection (a third mode) involving both fuel injector 26 and one or more direct fuel injectors 44. In some aspects, bypass mode module 240 may generate a bypass command for flow control valve 30 based on this desired fuel mode and based on inputs 210, which include factors that affect the ability of fuel injected by fuel injector 26 to vaporize during the first and third modes.

In some aspects, bypass mode module 240 may generate bypass command 254 to command flow control valve 30 in a manner the ensures vaporization of fuel injected by fuel injector 26. In some aspects, bypass mode module 240 may include mathematical relationships and/or a model that calculates a position of valve 30 that enables evaporation of fuel droplets injected with fuel injector 26 or a fuel injector at location 28. For example, bypass mode module 240 may be configured determine whether current engine conditions represented by inputs 210 would not result in sufficient evaporation of fuel injected by fuel injector 26. Under these conditions, bypass mode module 240 may therefore generate a bypass command 254 that increases the amount of intake air that bypasses air cooler 34, allowing for more energy transfer from the air to the fuel for vaporizing the fuel, and increasing the residence time of this fuel before it enters engine 14.

INDUSTRIAL APPLICABILITY

The disclosed aspects of intake and combustion system 12 may be employed in a variety of internal combustion engines that are configured to combust fuels, including internal combustion engines for combusting a low greenhouse gas fuel, such as methanol. System 12 may be included as a propulsion or power generation system that is useful for operating a marine vessel, a machine (e.g., dozer, excavator, loader, pipelaying machine, grading machine, etc.), a vehicle, or other device that employs an internal combustion engine. During operation of system 12, cylinders 42 of engine 14 may combust fuel, including fuel that is injected by one or more port injectors that are upstream of an intake manifold. System 12 may include one or more valves, such as flow control valve 30 that facilitate evaporation of fuel other than diesel fuel, such as methanol. For example, system 12 may generate signals for actuating valve 30 in a manner that increases a temperature of air supplied to engine 14 by causing this air to bypass a cooler. Additionally, system 12 may enable an increased residence time of injected fuel, causing this fuel to bypass a cooler before the injected fuel is received by an intake manifold and directed to an engine cylinder 42.

Figure 3:
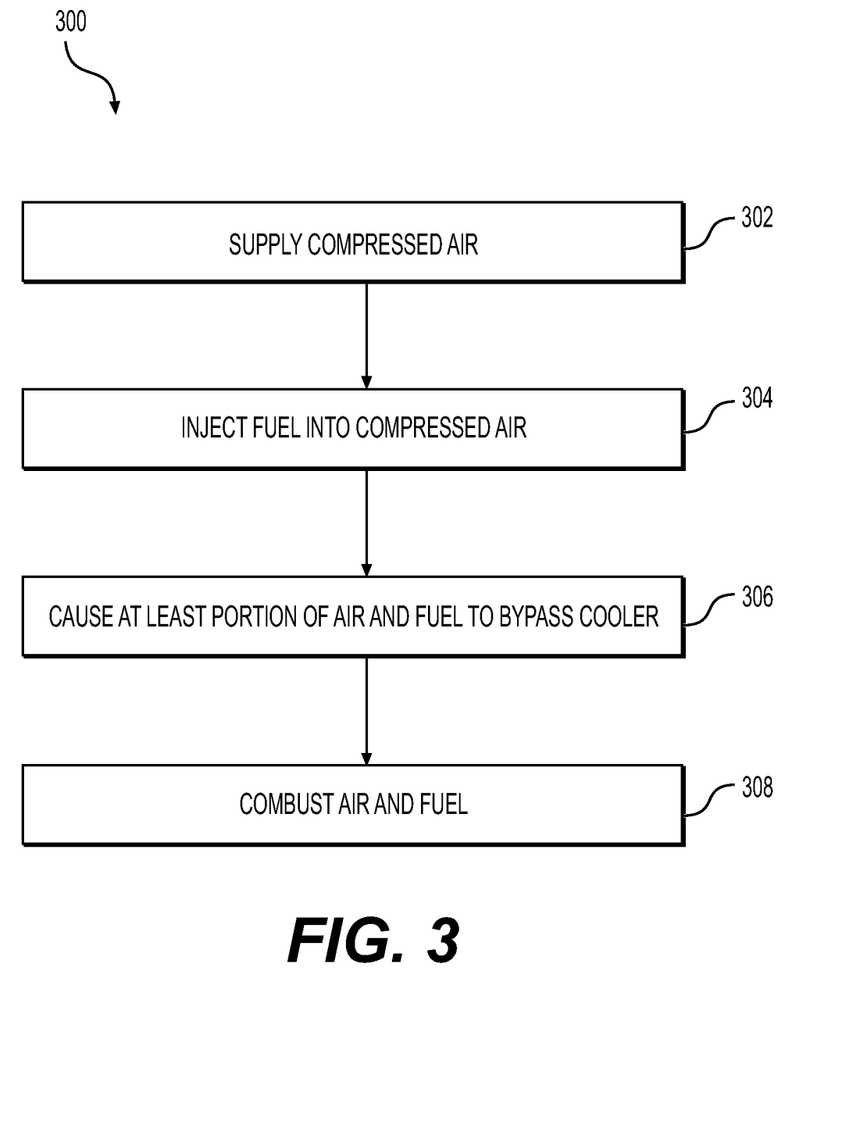
FIG. 3 is a flowchart depicting an exemplary fuel supply method useful with the intake and combustion system of FIG. 1.

FIG. 3 is a flowchart showing an exemplary fuel supply and combustion method 300 for operating system 12. During operation of system 12 according to method 300, compressed air may be supplied to an air and fuel supply system 16 during a step 302. Supplying compressed air may include compressing air with compressor 22 and guiding the air with compressed air passage 24. The air supplied in step 302 may, initially, be free of fuel.

A step 304 may include injecting fuel into the compressed air supplied during step 302. In a particular example, methanol may be injected by fuel injector 26, which may be secured to compressed air passage 24 or secured at location 28. Fuel injected during step 304 may be stored in liquid form. This fuel may be injected as a plurality of droplets that enter a stream of air that was compressed with compressor 22.

A step 306 may include causing at least some of the air compressed during step 302 and the fuel injected during step 304 to bypass a cooler, such as air cooler 34. This may tend to increase the temperature of fuel supplied to engine 14. In some aspects, step 306 may include generating a bypass command 254 based on one or more signals (e.g., signals 212, 214, 216, 218, 220) generated with sensor system 70. In particular, bypass command 254 may be generated by ECM 80 based on signals useful for estimating whether fuel from injector 26 will evaporate before reaching an engine cylinder 42 or intake manifold 50. In particular, signals indicative of conditions within intake manifold 50, such as intake pressure signal 212 and/or intake temperature signal 214, may be used to determine whether liquid fuel droplets will fully evaporate before reaching cylinder 42.

In addition to signals 212 and 214, signals 216, 218, 220, and/or fuel mode information (e.g., the first or third mode described above) determined by fuel mode module 230 may enable ECM 80 to determine whether fuel will fully evaporate. For example, as described above, mathematical relationships and/or a model-based approach enable ECM 80 to determine determining whether fuel is likely to evaporate based on signals 212, 214, 216, 218, and/or 220. A model-based approach may involve a model for evaporation of injected fuel, based on the temperature and pressure of intake air within intake plenum 36. Other data useful for evaporation modeling may include engine load, fuel rate, and other conditions of system 12.

When ECM 80 determines, during step 306, that fuel is unlikely to fully evaporate, ECM 80 may generate bypass command 254 to block flow to cooler 34 or reduce flow to cooler 34, in response to determining that current engine conditions may cause some of the fuel to reach engine 14 in a liquid state in the absence of a bypass command. Bypass command 254 generated during step 306 may cause at least some air from compressor 22 to bypass air cooler 34, entering intake manifold 50 via bypass passage 32. In embodiments where fuel injector 26 is secured to compressed air passage 24, bypass command 254 may also cause at least a portion of the fuel injected with fuel injector 26 to bypass air cooler 34. However, in embodiments where fuel is injected from an injector at location 28, an entirety of this fuel may bypass cooler 34, while a portion of the air bypasses air cooler 34.

A step 308 may include combusting the air supplied in step 302, the fuel injected in step 304, and the portion of air and fuel that bypasses air cooler 34 in step 306. As one example, methanol fuel, at least some of which bypasses air cooler 34 with some compressed air, may be combusted within cylinders 42 of engine 14. This combustion may be initiated by using a second fuel, such as diesel fuel, to generate a pilot flame (e.g., via compression ignition of diesel fuel). In alternate embodiments or at other times, this combustion may be initiated with spark plugs of engine 14. Thus, step 308 may include combusting only fuel that bypassed cooler 34, or only port-injected fuel. This fuel may be methanol. At other times and/or in other embodiments, step 308 may include combusting fuel, some of which bypasses cooler 34 and some of which passes through cooler 34.

While steps 302, 304, 306, and 308 of method 300 were described in an exemplary order, and are shown in an exemplary order in FIG. 3, as understood, one or more of the steps may be performed in a different order, at partially or entirely overlapping periods of time, etc. Additionally, one or more of the steps 302, 304, 306, 308, and other aspects of method 300 may be performed intermittently during the operation of engine 14, while one or more other steps or aspects of method 300 may be performed continuously during operation of engine 14. For example, compressed air may be supplied at regular or continuous periods during operation of engine 14, while the period of time during which air bypasses cooler 34 may be intermittent or periodic, based on the above-described determinations performed by ECM 80 and current operating conditions of system 12. Thus, system 12 and ECM 80 may, as part of method 300, evaluate when it is desirable to cause air, fuel, or both, to bypass air cooler 34 to facilitate full vaporization of fuel stored as a liquid, such as methanol.

The disclosed system and method may facilitate the use of one or more low-greenhouse gas-producing fuels, fuels from renewable sources, low-soot generating fuels, and others, which are capable of being stored in liquid form and/or supplied in liquid form to an injector upstream of an intake manifold. In a particular example, the disclosed system and method may be useful for methanol fuel that is injected into a path that, during at least some operating conditions, enables the fuel to bypass a cooler. Additionally, the disclosed system and method may allow at least some air to bypass an air cooler during certain operating conditions. These functions may facilitate full vaporization of this fuel. In some aspects, the disclosed system and method may facilitate injection of methanol, which has a relatively high latent heat of vaporization. In particular, bypassing a portion of air or an air-fuel mixture can, in at least some embodiments, enable injection of increased quantities of methanol, and ensure additional residence time and/or increased temperatures to facilitate full evaporation of this methanol or other fuel.

It will be apparent to those skilled in the art that various modifications and variations can be made to the disclosed system and method without departing from the scope of the disclosure. Other embodiments of the system and method will be apparent to those skilled in the art from consideration of the specification and system and method disclosed herein. It is intended that the specification and examples be considered as exemplary only, with a true scope of the disclosure being indicated by the following claims and their equivalents.

What is claimed is:

1. A fuel supply system for an internal combustion engine, the fuel supply system comprising:
   an air compressor;
   a compressed air supply passage connected downstream of the air compressor;
   an air cooler connected downstream of the air compressor and the compressed air supply passage;
   a bypass passage connected downstream of the air compressor;
   a fuel injector secured to the compressed air supply passage or secured to the bypass passage; and
   a valve connected between the air compressor and the air cooler, the valve being configured to block a flow of intake air to the air cooler, causing the intake air to flow to the bypass passage or to permit the flow of intake air to the air cooler.

2. The fuel supply system of claim 1, wherein the valve includes an inlet opening connected between the air compressor and the air cooler and an outlet connected between the inlet and the air cooler.

3. The fuel supply system of claim 2, wherein the valve further includes an additional outlet connected between the inlet and the bypass passage.

4. The fuel supply system of claim 1, wherein the fuel injector is connected upstream of the air cooler.

5. The fuel supply system of claim 1, wherein the fuel injector is secured to the bypass passage.

6. The fuel supply system of claim 1, further including an additional fuel injector configured to inject fuel directly into a cylinder of the internal combustion engine.

7. The fuel supply system of claim 6, wherein the fuel injector secured to the compressed air supply passage is configured to inject a liquid fuel that is different than a fuel injected by the additional fuel injector.

8. A fuel supply system, comprising:
an internal combustion engine;
an air compressor configured to compress air received by the internal combustion engine; a compressed air supply passage connected downstream of the air compressor;
an air cooler for reducing a temperature of the compressed air;
a compressed air bypass passage connected downstream of the air compressor;
a fuel injector secured to the compressed air supply passage or secured to the compressed air bypass passage;
a bypass valve having a bypass position configured to cause at least a portion of the compressed air to bypass the air cooler; and
an electronic control module configured to generate a command to cause the bypass valve to enter the bypass position.

9. The fuel supply system of claim 8, further comprising a sensor system including at least one sensor configured to generate a signal that is received with the electronic control module for determining when to generate the command to cause the bypass valve to enter the bypass position.

10. The fuel supply system of claim 9, wherein the at least one sensor includes an intake air pressure sensor, an intake air temperature sensor, an intake air flow sensor, an engine speed sensor, or a turbocharger speed sensor.

11. The fuel supply system of claim 10, wherein the engine control module is configured to generate the command to cause the bypass valve to enter the bypass position based a sensed intake air temperature or a sensed intake air pressure.

12. The fuel supply system of claim 8, wherein, when the bypass valve is in the bypass position, a path of fuel to the internal combustion engine from the fuel injector is lengthened.

13. A fuel supply method for supplying fuel to an internal combustion engine, the method comprising:
compressing air with an air compressor;
injecting fuel into the compressed air at a location upstream of an intake plenum to form a fuel and air mixture, the intake plenum being a portion of an intake manifold having a plurality of runners extending from the intake plenum toward the internal combustion engine;
causing at least some compressed air to bypass an air cooler;
supplying the air and fuel mixture to the internal combustion engine; and
combusting the air and fuel mixture within the internal combustion engine.

14. The fuel supply method of claim 13, wherein the fuel is injected upstream of the air cooler.

15. The fuel supply method of claim 13, wherein the fuel is injected in a passage that bypasses the air cooler.

16. The fuel supply method of claim 13, wherein the fuel includes at least 50% alcohol, by volume.

17. The fuel supply method of claim 13, further including controlling a bypass valve to cause at least some of the air and fuel mixture to bypass the air cooler.

18. The fuel supply method of claim 17, further including generating a command to control the bypass valve that causes a first portion of the air and fuel mixture to bypass the air cooler and a second portion of the air and fuel mixture to enter the air cooler.

19. The fuel supply method of claim 13, wherein the fuel is methanol.

20. The fuel supply method of claim 13, wherein the compressed air, when bypassing the air cooler, travels a greater distance to the internal combustion engine as compared to compressed air that does not bypass the air cooler.

\* \* \* \* \*